United States Patent
Bechmann et al.

(10) Patent No.: US 10,780,522 B2
(45) Date of Patent: Sep. 22, 2020

(54) METHOD FOR AUTOMATABLE OR AUTOMATED DETERMINATION OF THE FOCAL POSITION OF A LASER BEAM GENERATED BY AN EXPOSURE DEVICE

(71) Applicant: CL SCHUTZRECHTSVERWALTUNGS GMBH, Lichtenfels (DE)

(72) Inventors: Florian Bechmann, Lichtenfels (DE); Markus Stark, Waizenburg (DE); Fabian Zeulner, Lichtenfels (DE)

(73) Assignee: Concept Laser GmbH, Lichtenfels (DE)

( * ) Notice: Subject to any disclaimer, the term of this patent is extended or adjusted under 35 U.S.C. 154(b) by 277 days.

(21) Appl. No.: 15/809,883

(22) Filed: Nov. 10, 2017

(65) Prior Publication Data
US 2018/0133836 A1 May 17, 2018

(30) Foreign Application Priority Data
Nov. 11, 2016 (DE) .......... 10 2016 121 649

(51) Int. Cl.
*B23K 26/03* (2006.01)
*B22F 3/105* (2006.01)
(Continued)

(52) U.S. Cl.
CPC .......... *B23K 26/032* (2013.01); *B22F 3/1055* (2013.01); *B23K 26/046* (2013.01);
(Continued)

(58) Field of Classification Search
CPC ................................................. B23K 26/032
(Continued)

(56) References Cited

U.S. PATENT DOCUMENTS 9,878,497 B2 1/2018 Schwarze et al.
2006/0138111 A1* 6/2006 Hillebrand ............ B23K 26/04
219/121.83
(Continued)

FOREIGN PATENT DOCUMENTS

DE 10255628 A1 7/2004
JP 2010199453 A 9/2010
(Continued)

*Primary Examiner* — Christine J Skubinna
(74) *Attorney, Agent, or Firm* — Dority & Manning, P.A.

(57) ABSTRACT

A method for automatable or automated determination of the focal position of a laser beam (2) including the following steps: —arranging a substrate (10) in a first exposure position ($z_1$), and exposing the substrate (10) with at least one exposure vector (13) in the first exposure position ($z_1$), —moving the substrate (10) into several other exposure positions, in which the substrate (10) is respectively arranged in another certain z-axis position ($z_n$) relative to the reference point (11), and respectively exposing the substrate (10) with at least one exposure vector (13) in the respective other exposure positions ($z_n$), —optically evaluating the exposure pattern (12) by detecting different contrast sections in the exposure pattern (12) that can be optically detected, —determining the focal position of the laser beam (2) based on the detected optical contrast sections.

20 Claims, 2 Drawing Sheets

(51) Int. Cl.
- *G02B 7/36* (2006.01)
- *B29C 64/393* (2017.01)
- *B33Y 50/02* (2015.01)
- *B23K 26/34* (2014.01)
- *B29C 64/153* (2017.01)
- *B29C 64/00* (2017.01)
- *B33Y 10/00* (2015.01)
- *B23K 26/046* (2014.01)
- *B23K 26/362* (2014.01)

(52) U.S. Cl.
CPC ............ *B23K 26/34* (2013.01); *B23K 26/362* (2013.01); *B29C 64/00* (2017.08); *B29C 64/153* (2017.08); *B29C 64/393* (2017.08); *B33Y 10/00* (2014.12); *B33Y 50/02* (2014.12); *G02B 7/36* (2013.01); *B22F 2003/1057* (2013.01); *B22F 2999/00* (2013.01); *Y02P 10/295* (2015.11)

(58) Field of Classification Search
USPC .................................................. 219/121.61
See application file for complete search history.

(56) References Cited

U.S. PATENT DOCUMENTS

| | | |
|---|---|---|
| 2008/0208499 A1 | 8/2008 | Miyashita |
| 2016/0080632 A1 | 3/2016 | Iwase et al. |
| 2016/0175935 A1 | 6/2016 | Ladewig et al. |

FOREIGN PATENT DOCUMENTS

| | | |
|---|---|---|
| JP | 2015128898 A | 7/2015 |
| WO | WO2007/043535 A1 | 4/2007 |
| WO | 2015191257 A1 | 12/2015 |

* cited by examiner

METHOD FOR AUTOMATABLE OR AUTOMATED DETERMINATION OF THE FOCAL POSITION OF A LASER BEAM GENERATED BY AN EXPOSURE DEVICE

CROSS REFERENCE TO RELATED APPLICATIONS

This application claims priority to German Patent Application serial no. 10 2016 121 649.6 filed Nov. 11, 2016, the contents of which is incorporated herein by reference in its entirety as if set forth verbatim.

The invention relates to a method for automatable or automated determination of the focal position of a laser beam generated by an exposure device of an apparatus for additive manufacturing of three-dimensional objects, wherein the apparatus has an x-axis defined by a first machine axis horizontally oriented, a y-axis defined by a second machine axis horizontally oriented, and a z-axis defined by a third machine axis vertically oriented.

The determination of the focal position of a laser beam generated by an exposure device of an apparatus for additive manufacturing of three-dimensional objects is a relevant process in the additive manufacturing of three-dimensional objects that can be performed or is performed. The determination of the focal position of the laser beam and the subsequent use of a focused laser beam for the selective solidification of the construction material layers to be selectively solidified when performing an additive construction or manufacturing process is crucial for the desired solidification of the construction material and thus for the structural properties of respective three-dimensional objects to be additively manufactured or manufactured.

Until now, it has been common to determine the focal position of the laser beam such that by exposing a substrate, e.g., an aluminum sheet, in different z-axis positions of the substrate, a certain exposure pattern is generated on the substrate. This or the generated exposure patterns are examined by a technician. That z-axis position having the exposure pattern with the thinnest exposure vectors is determined to be "zero position", in which the laser beam is focused. This approach is on the one hand not very accurate and on the other hand extensive, because it cannot be automated.

The invention is based on the object of providing, in contrast to the above, especially in terms of accuracy and automation, an improved method for determining the focal position of a laser beam generated by an exposure device of an apparatus for additive manufacturing of three-dimensional objects.

The object is solved by a method for automatable or automated determination of the focal position of a laser beam generated by an exposure device of an apparatus for additive manufacturing of three-dimensional objects according to claim 1. The dependent claims relate to possible embodiments of the method.

The method herein described serves the automatable or automated determination of the focal position of a laser beam generated by an exposure device of an apparatus provided for additive manufacturing of three-dimensional objects ("apparatus"), i.e., especially an apparatus for performing selective laser melting methods, SLM methods in short. The exposure device typically comprises a laser beam generation device, which is provided for generating a laser beam with certain beam properties, i.e., for example, a certain wavelength, and a beam deflection device also referred to as or considered a scanner device, which is provided for specific deflection of a laser beam generated by the laser beam generation device to a surface to be (selectively) exposed.

The apparatus has an x-axis defined by a first machine axis horizontally oriented, a y-axis defined by a second machine axis horizontally oriented, and a z-axis defined by a third machine axis vertically oriented. The axes mentioned can—analog to a Cartesian coordinate system—be arranged or oriented orthogonally to each other. The plane defined by the x-axis and the y-axis typically comprises the construction field, in which the selective exposure and thus the selective solidification of construction material layers of a construction material that can be solidified by means of a respective laser radiation, carried out in operation of the apparatus, is carried out.

The method described herein comprises the steps explained in more detail below:

In a first step of the method, arranging a substrate in a first exposure position, in which the substrate is arranged in a certain z-axis position relative to a reference point, and exposing the substrate with at least one exposure vector in the first exposure position, is carried out.

In the automatable or automated first step of the method, exposure of a substrate, i.e., for example, an (anodized) aluminum sheet, a steel foil, or a photographic paper, is thus carried out with at least one exposure vector. An exposure vector is defined by two points and has thus typically a (straight) linear course. Of course, it is possible to expose the substrate with several exposure vectors forming an exposure pattern or a part of such a pattern. The exposure of the substrate is carried out in a first exposure position, in which the substrate is arranged in a certain z-axis position relative to a reference point, i.e., in which the substrate is arranged in a certain distance in z-direction relative to the reference point. The reference point can, e.g., be the laser beam exit point of the exposure device, i.e. that point at which the laser beam exits the exposure device, i.e. typically the beam deflection device, into a (inertable) process chamber of the apparatus. The substrate is typically arranged or formed on a carrying element, movably supported along the z-axis, of a carrying device of the apparatus provided for carrying a three-dimensional object to be additively manufactured or manufactured.

In a subsequent second step of the method, moving the substrate, especially in steps or stages, into several further exposure positions in which the substrate is respectively arranged in another certain z-axis position relative to the reference point, and respectively exposing the substrate with at least one exposure vector in the respective further exposure positions, is carried out, wherein an exposure pattern forms on the substrate, defined by the substrate sections exposed corresponding to the respective exposure vectors, wherein the exposure vectors in successive exposure positions are assigned to different z-axis positions.

The automatable or automated second step of the method can be divided into several sub steps. In a respective sub step, the substrate is arranged in a certain exposure position different from a previous exposure position in which the substrate is arranged in a certain z-axis position (different from a preceding z-axis position) relative to the reference point, i.e., in which the substrate is arranged in a certain distance in z-direction relative to the reference point, and is exposed with at least one exposure vector. The other exposure positions can, regarding their respective z-axis positions, e.g., be displaced by an offset in a range between 0.5 and 1 mm, especially 0.1 mm; the exposure positions in z-direction can thus, e.g., be spaced apart by an offset in a range between 0.5 and 1 mm.

The exposure vectors, with which the substrate is exposed in the respective further exposure positions, are typically arranged or oriented spaced apart from each other; for example, they can be arranged or oriented in parallel. Moving the substrate into the respective exposure positions or z-axis positions relative to the reference point is carried out by respectively moving the one component of the carrying element forming the carrying device provided for carrying a three-dimensional object to be additively manufactured or additively manufactured into z-axis positions corresponding to the respective exposure positions; as mentioned, the substrate is typically arranged or formed on a carrying element movably supported along the z-axis of a carrying device of the apparatus provided for carrying a three-dimensional object to be additively manufactured or additively manufactured.

Due to the substrate sections exposed corresponding to the respective exposure vectors, a defined exposure pattern forms on the substrate. The exposure pattern comprises the exposure vectors, with which the substrate was exposed in the different exposure positions, or is formed by the exposure vectors, with which the substrate was exposed in the different exposure positions. The exposure vectors, with which the substrate is exposed in the respective exposure positions or with which the substrate is exposed in successive or different exposure positions, can be assigned or are assigned to respective successive or different z-axis positions.

In a third step of the method, optically evaluating the exposure pattern formed in the second step of the method by detecting different optically detectable color or contrast sections in the exposure pattern is carried out.

In the third step of the method, an automatable or automated optical examination of the exposure pattern, in general of the substrate or of the exposed substrate surface, is thus carried out in terms of color or contrast sections or color or contrast differences generated by the exposure. Optically detectable color and contrast sections or color or contrast differences are understood to especially mean sections in the exposure pattern in which an optically detectable color difference or contrast is given. Here, these are typically optically accurately detectable light-dark-sections, i.e. sections in which the exposure pattern, in general the substrate or the exposed substrate surface, has light(er) and dark(er) sections. As a result of the fact that the exposure vectors, with which the substrate in the respective exposure positions or with which the substrate in successive or different exposure positions is exposed, can be assigned or are assigned to successive or different z-axis positions, assigning the color or contrast sections optically detected in the exposure pattern to the respective exposure positions or z-axis positions is also possible.

In a fourth step of the method, determining the focal position of the laser beam based on the detected optical contrast sections is carried out.

In the automatable or automated fourth step of the method, the focal position of the laser beam is determined based on the detected optical contrast sections. Here, advantage is taken of the fact that lighter sections typically indicate that the laser beam is not focused, and (by comparison) dark(er) sections typically indicate that the laser beam is focused; depending on whether the laser beam is hitting the substrate in a defocused or a focused manner, color or contrast sections in different colors are formed on the substrate, wherein by comparison light color or contrast sections typically indicate that the laser beam in the respective exposure position is defocused, and by comparison dark color or contrast sections typically indicate that the laser beam in the respective exposure position is focused. With the possibility of assigning the color or contrast sections optically detected in the exposure pattern to the respective exposure positions or z-axis positions, it can be accurately determined in which exposure position or z-axis position the laser beam is focused.

In a possible fifth step of the method, based on the determined focal position of the laser beam, an, especially automated, adjustment of the arrangement and/or orientation of the exposure device relative to a construction field of the apparatus to be selectively exposed in performing selective construction processes can be carried out, if required.

Consequently, in terms of accuracy and automation, an improved method for determining the focal position of a laser beam generated by an exposure device of an apparatus for additive manufacturing of three-dimensional objects is provided.

The automatable or automated performance of the method is typically realized via a control device communicating with the respective functional components of the apparatus required for performing the method. The control device is provided for generating respective control commands.

The exposure pattern can be formed with certain optically detectable geometric assignment features, wherein a respective assignment feature is assigned to a certain exposure position and/or a certain z-axis position. By the specific generation of respective optically detectable geometric assignment features, wherein a respective assignment feature is assigned to a certain exposure position and/or a certain z-axis position, a scale toward the z-axis (z-scale) can be formed, which (considerably) facilitates the assignment of respective color or contrast sections to a certain exposure position or to a certain z-axis position carried out in determining the focal position of the laser beam.

An exposure pattern having respective optically detectable geometric assignment features can, e.g., be a tooth-shaped or pinnacle-shaped exposure pattern. Consequently, a tooth-shaped or pinnacle-shaped exposure pattern can be formed. The tips of the respective teeth or pinnacles can be used as certain optically detectable geometric assignment features, to each of which a certain exposure position and/or a certain z-axis position is assigned. The formation of a respective tooth-shaped or pinnacle-shaped exposure pattern can be carried out by the generation of exposure vectors arranged or oriented in parallel, which differ in length, leading to a tooth-shaped or pinnacle-shaped exposure pattern. Of course, in addition to tooth-shaped or pinnacle-shaped exposure patterns, geometrically different exposure patterns, i.e., for example, extending curved in their edge sections, are also conceivable, which have respective optically detectable geometric assignment features.

The exposure pattern can be formed with an optically detectable assignment feature, with said assignment feature defining a beginning of the exposure pattern or being assigned to a beginning of the exposure pattern. Such an assignment feature can, for example, be a line at least one time, possibly several times, projecting beyond the dimensions of the remaining exposure pattern. Using a respective assignment feature, the beginning of the exposure pattern that is to be optically evaluated in the following can be defined or detected in a simple manner.

It has been mentioned that the exposure vectors, with which the substrate is exposed in the respective further exposure positions, are typically arranged or oriented spaced apart from each other; for example, they can be arranged or oriented in parallel. Consequently, at least two exposure vectors, especially toward the x-axis or y-axis, can be arranged or oriented in parallel. The exposure vectors can, regarding the respective z-axis positions and/or y-axis positions thereof, e.g., be arranged displaced by an offset in a range between 0.1 and 1 mm, especially an offset of 0.2 mm; the exposure vectors can in x-direction and/or y-direction thus, e.g., be spaced apart by an offset in a range between 0.1 and 1 mm. As a matter of principle, the distance of the exposure vectors should be selected so narrow that in the focal position of the laser beam to be determined or determined, the exposure vectors can just about be detected as individual exposure vectors.

To evaluate the exposure pattern optically by detecting different optical contrast sections in the exposure pattern and to determine the focal position of the laser beam based on the detected optical contrast sections, a detection and determination device being present in the apparatus can be used. The detection and/or determination device can comprise at least one optical detection means, especially a camera, for detecting different optical contrast sections in the exposure pattern, and at least one evaluation means for determining the focal position of the laser beam based on the optical contrast sections detected. The detection and/or determination device can be equipped with suitable detection and/or determination algorithms, especially optical evaluation algorithms.

Alternatively or complementary, it is, however, also possible that for optically evaluating the exposure pattern by detecting different optical contrast sections in the exposure pattern and for determining the focal position of the laser beam based on the detected optical contrast sections, a detection and determination device being present in a mobile end device of a user, especially a smart phone or a tablet, laptop, etc., is used. The detection and/or determination device can—analog to a detection and/or determination device being present in the apparatus—comprise at least one optical detection means, especially a camera, for detecting different optical contrast sections in the exposure pattern, and at least one evaluation means for determining the focal position of the laser beam based on the optical contrast sections detected. The detection and/or determination device can be equipped with suitable detection and/or determination algorithms, especially optical evaluation algorithms, and can, e.g., be implemented as an "app".

In addition to the method, the invention relates to an apparatus for additive manufacturing of three-dimensional objects. In addition to the other functional components required for performing additive construction processes, the apparatus comprises an exposure device for generating a laser beam directed to a construction field of the apparatus and is characterized in that it is provided for performing the method described. For this purpose, the apparatus can comprise a detection and determination device, which is provided for optically evaluating the exposure pattern by detecting different optically detectable contrast sections in the exposure pattern and for determining the focal position of the laser beam based on the optically detected contrast sections. All embodiments in connection with the method analogously apply to the apparatus.

The invention is explained in more detail by means of exemplary embodiments in the figures of the drawings. In which:

FIG. 1 shows a schematic diagram of an apparatus 1 according to an exemplary embodiment. In FIG. 1, only that detail of the apparatus 1 is shown that is relevant for the discussion of the principle described in the following.

Figure 1:
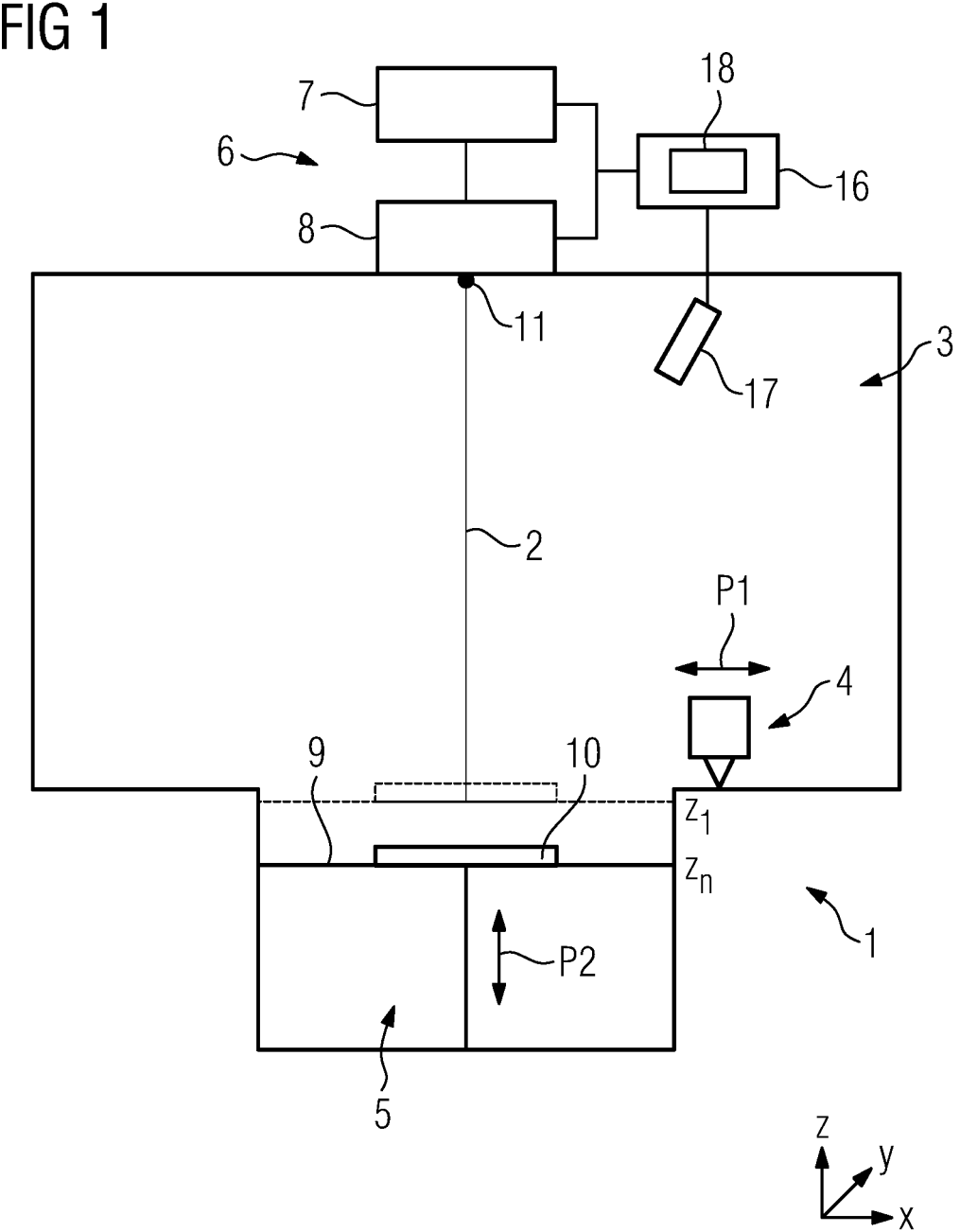
FIG. 1 shows a schematic diagram of an apparatus according to an exemplary embodiment.

The apparatus 1, which is, e.g., an SLM apparatus, i.e. an apparatus for performing selective melting methods (SLM methods), serves the additive manufacturing of three-dimensional objects, i.e. especially technical components or technical component groups, by successive, selective layer-by-layer exposure and thus solidification of construction material layers, i.e., for example, a metal powder, that can be solidified by means of a laser beam 2. The selective solidification of respective construction material layers to be solidified is carried out based on object-related construction data. Respective construction data describe the geometric or geometric structural design of the respective object to be additively manufactured. Respective construction data can, include for example, "sliced" CAD data of the object to be manufactured.

The apparatus 1 has an x-axis defined by a first machine axis horizontally oriented, a y-axis defined by a second machine axis horizontally oriented, and a z-axis defined by a third machine axis vertically oriented. The plane defined by the x-axis and the y-axis typically comprises the construction field, in which the selective exposure and thus selective solidification of construction material layers of a construction material that can be solidified by means of a respective laser radiation, which is carried out in operation of the apparatus 1, is carried out.

The apparatus 1 comprises an inertable process chamber 3, in which the actual additive manufacturing of respective objects is carried out. In the process chamber 3 at least one part of the functional components of the apparatus required for performing additive construction processes, i.e. especially a coating device 4 movably supported as indicated by the horizontally oriented double arrow P1, and provided for forming construction material layers to be solidified in a construction plane is arranged or formed.

A carrying device 5 provided for carrying an object to be additively manufactured or additively manufactured is arranged below the process chamber 3. The carrying device 5 comprises a carrying element 9 movably supported along the z-axis, as indicated by the vertically oriented double arrow P2. The carrying element 9 can form a bottom of a module (not shown) that can be inserted into the process chamber 3, especially a construction module, or can be coupled with a bottom of a module that can be inserted into the process chamber 3, especially a construction module.

The apparatus 1 comprises an exposure device 6. The exposure device 6 comprises a laser beam generation device 7, which is provided for generating a laser beam 2 with certain beam properties, i.e., for example, a certain wavelength, and a beam deflection device 8 also referred to as or considered a scanner device, which is provided for specific deflection of the laser beam 2 generated by the laser beam generation device 7 to a surface to be (selectively) exposed, i.e., to a construction material layer to be selectively exposed or to be selectively solidified in performing additive construction processes.

Using the apparatus 1, an automatable or automated method for determining the focal position of the laser beam 2 generated by the exposure device 6 can be realized, which in the following is explained in more detail. The automatable or automated performance of the method is realized via a control device (not shown) communicating with the respective functional components of the apparatus 1 required for performing the method. The control device is provided for generating respective control commands.

In the automatable or automated first step of the method, an exposure of a substrate 10, i.e., for example, an (anodized) aluminum sheet, a steel foil, or a photographic paper, is carried out with at least one exposure vector 13. The substrate 10 is arranged on the carrying element 9 of the carrying device 5 of the apparatus 1. The exposure of the substrate 10 is carried out in a first exposure position $z_1$, in which the substrate 10 is arranged in a certain z-axis position relative to a reference point 11, i.e., in which the substrate 10 is arranged in a certain distance in z-direction relative to the reference point 11. The reference point 11 is, for example, the laser beam exit point of the exposure device 6, i.e. the point, at which the laser beam 2 exits the exposure device 6 and enters into the process chamber 3 of the apparatus 1.

The automatable or automated second step of the method can be divided into several sub steps. In a respective sub step, the substrate 10 is arranged in a certain exposure position $z_n$ different from a previous exposure position $z_1$, in which the substrate 10 is arranged in a certain z-axis position (different from a preceding z-axis position) relative to the reference point 11, i.e., in which the substrate 10 is arranged at a certain distance in z-direction relative to the reference point 11, and is exposed with at least one exposure vector 13. The other exposure positions $z_n$ are, regarding their respective z-axis positions, e.g., displaced by an offset in a range between 0.5 and 1 mm, especially 0.1 mm; the exposure positions ($z_1$-$z_n$) in z-direction are thus, e.g., spaced apart by an offset in a range between 0.5 and 1 mm. In FIG. 1, the substrate 10 is for the sake of clarity shown merely exemplarily in only two exposure positions $z_1$, $z_n$, one of which is shown as a dashed line, and one is shown as a solid line.

The exposure vectors 13, with which the substrate 10 is exposed in the respective other exposure positions $z_n$, are also in the x-direction and/or y-direction or the plane spanned by the x- and y-axis arranged or oriented spaced apart, as will be explained further below in connection with the description of the exposure pattern 12 shown in FIG. 2. Moving the substrate 10 into the respective exposure positions $z_n$ or the z-axis positions relative to the reference point 11 is carried out by the respective movement of the carrying element 9 in z-axis positions corresponding the respective exposure positions.

Figure 2:
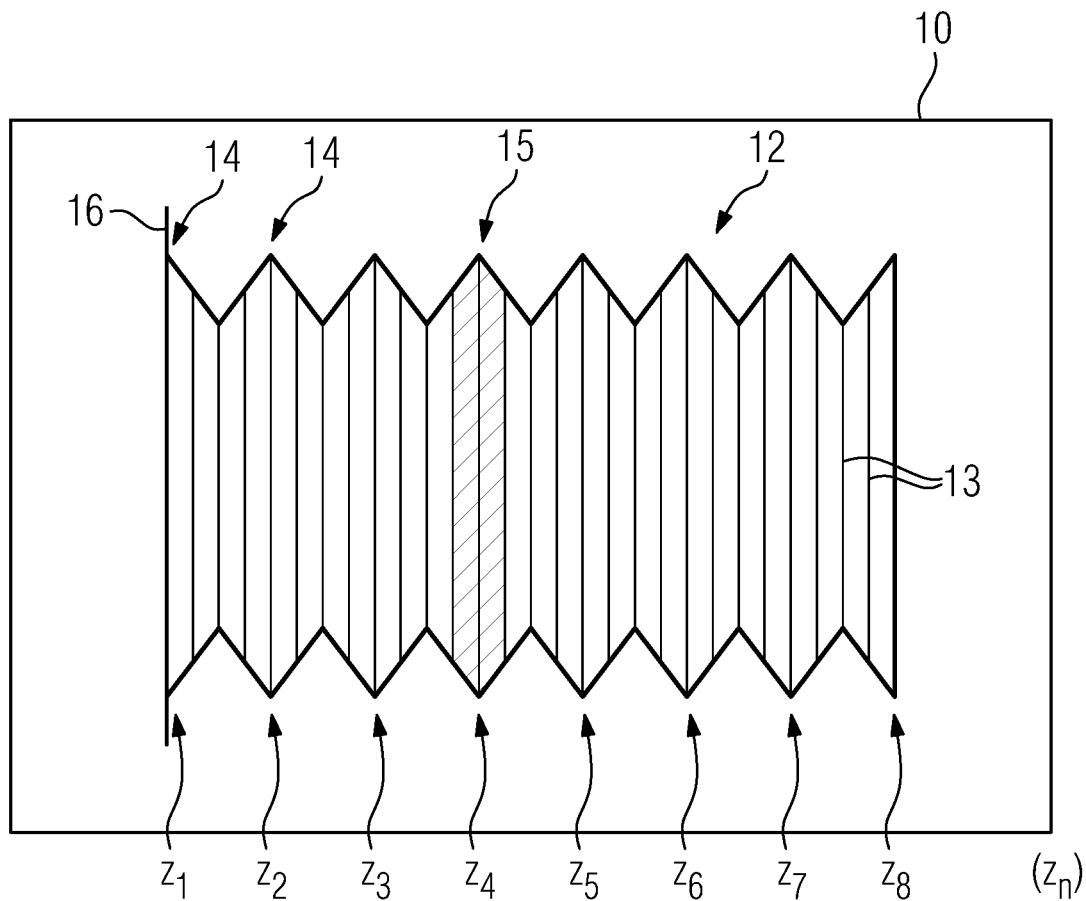
FIG. 2 shows a schematic diagram of an exposure pattern according to an exemplary embodiment.
Figure 2:
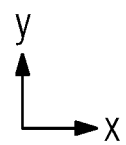

Due to the substrate sections exposed corresponding to the respective exposure vectors 13, a defined exposure pattern 12 forms on the substrate 10 (cf. FIG. 2). The exposure pattern 12 comprises the exposure vectors 13, with which the substrate 10 was exposed in the different exposure positions $z_1$-$z_n$, or is formed by the exposure vectors 13, with which the substrate 10 was exposed in the different exposure positions $z_1$-$z_n$. The exposure vectors 13, with which the substrate 10 is exposed in the respective exposure positions $z_1$-$z_n$ or with which the substrate 10 is exposed in successive or different exposure positions $z_1$-$z_n$, can be assigned or are assigned to respective successive or different z-axis positions.

In the automatable or automated third step of the method, an automatable or automated optical examination of the exposure pattern 12 is carried out in terms of the color or contrast sections or color or contrast differences generated by the exposure. Optically detectable color and contrast sections or color or contrast differences are understood to mean sections in the exposure pattern 12 in which an optically detectable color difference or contrast is given. Here, these are typically optically accurately detectable light-dark-sections, i.e. sections in which the exposure pattern 12, the substrate 10, or the exposed substrate surface, respectively, has light(er) and dark(er) sections. As a result of the fact that the exposure vectors 13, with which the substrate 10 in the respective exposure positions $z_1$-$z_n$ or with which the substrate 10 in successive or different exposure positions $z_1$-$z_n$ is exposed, can be assigned or are assigned to successive or different z-axis positions, assigning the color or contrast sections optically detected in the exposure pattern 12 to respective exposure positions $z_1$, $z_n$, or z-axis positions is also possible.

In the automatable or automated fourth step of the method, the focal position of the laser beam 2 is determined based on the detected optical contrast sections. Here, it is taken advantage of the fact that lighter sections indicate that the laser beam 2 is not focused and (by comparison) dark(er) sections, cf. the shaded section 15, indicate that the laser beam 2 is focused. With the possibility of assigning the color or contrast sections optically detected in the exposure pattern 12 to the respective exposure positions $z_1$, $z_n$, or z-axis positions, it can be accurately determined in which exposure position or z-axis position the laser beam 2 is focused.

In a possible fifth step of the method, based on the determined focal position of the laser beam 2, an, especially automated, adjustment of the arrangement and/or orientation of the exposure device 6 relative to a construction field of the apparatus 1 to be selectively exposed in performing selective construction processes is carried out, if required.

FIG. 2 shows a schematic diagram of an exposure pattern 12 according to an exemplary embodiment in a top view.

From FIG. 2 it can be seen that the exposure pattern 12 can be formed with certain optically detectable geometric assignment features 14, wherein a respective assignment feature 14 is assigned to a certain exposure position $z_1$, $z_n$, and/or a certain z-axis position. By the specific generation of respective optically detectable geometric assignment features 14, a scale toward the z-axis (z-scale) can be formed which (considerably) facilitates the assignment of respective color or contrast sections to a certain exposure position $z_1$, $z_n$, or to a certain z-axis position carried out in determining the focal position of the laser beam 2.

In the exemplary embodiment shown in FIG. 2, the exposure pattern 12 has a tooth-shaped geometry or a tooth-shaped (outer) contour. As certain optically detectable geometric assignment features 14, e.g., the tips of the teeth are used, to each of which a certain exposure position $z_1$, $z_n$, and/or a certain z-axis position is assigned. The formation of a respective tooth-shaped exposure pattern 12 can be carried out by the generation of exposure vectors 13 arranged or oriented in parallel, which differ in their length, leading to a tooth-shaped exposure pattern 12. The exposure vectors 13 arranged in parallel are in the exemplary embodiment arranged in parallel toward the x-axis and regarding their respective x-axis positions are arranged displaced by an offset in a range between 0.1 and 1 mm, especially by an offset of 0.2 mm. The distance of the exposure vectors 13 is selected so narrow that in the focal position of the laser beam 2 to be determined or determined, the exposure vectors 13 can just about be detected as individual exposure vectors 13.

From FIG. 2 it can further be seen that the exposure pattern 12 is formed with an optically detectable assignment feature 16, with said assignment feature 16 defining a beginning of the exposure pattern 12 or being assigned to a beginning of the exposure pattern 12. The assignment feature 16 is in the exemplary embodiment according to FIG. 2 a line projecting beyond the dimensions of the remaining exposure pattern 12 and being optically detectable. The line was formed by an exposure vector 13 that, by comparison, is longer. By the assignment feature 16, the beginning of the exposure pattern 12 that is to be optically evaluated can be defined or detected in a simple manner.

To evaluate the exposure pattern 12 optically by detecting different optical contrast sections in the exposure pattern 12 and to determine the focal position of the laser beam 2 based on the detected optical contrast sections, a detection and determination device 16 being present in the apparatus is used. The detection and/or determination device 16 can comprise an optical detection means 17, especially a camera, for detecting different optical contrast sections in the exposure pattern 12, and an evaluation means 18 for determining the focal position of the laser beam 2 based on the detected optical contrast sections. The detection and/or determination device 16 can be equipped with suitable detection and/or determination algorithms, especially optical evaluation algorithms.

Alternatively or complementary, it is, however, also possible that for optically evaluating the exposure pattern 12 by detecting different optical contrast sections in the exposure pattern 12 and for determining the focal position of the laser beam 2 based on the detected optical contrast sections, a detection and determination device being present in a mobile end device of a user, especially a smart phone or a tablet, laptop, etc., is used. The detection and/or determination device can—analog to the detection and/or determination device 16 being present in the apparatus—comprise an optical detection means, especially a camera, for detecting different optical contrast sections in the exposure pattern 12, and an evaluation means for determining the focal position of the laser beam 2 based on the optical contrast sections detected. The detection and/or determination device can be equipped with suitable detection and/or determination algorithms, especially optical evaluation algorithms, and can, e.g., be implemented as an "app".

The invention claimed is:

1. A method for automated determination of a focal position of a laser beam generated by an exposure device of an apparatus for additive manufacturing of three-dimensional objects, wherein the apparatus comprises an x-axis horizontally oriented, a y-axis horizontally oriented, and a z-axis vertically oriented, the method comprising:
   exposing the substrate with at least one exposure vector while in a first exposure position on the z-axis to form a first exposure pattern;
   exposing the substrate with at least one exposure vector while in a second exposure position on the z-axis to form a second exposure pattern;
   optically evaluating an optical contrast between the first exposure and the second exposure; and,
   determining the focal position of the laser beam based at least in part on the optical evaluation.

2. The method of claim 1, wherein the optical contrast comprises a difference in darkness.

3. The method of claim 1, wherein the optical contrast comprises a difference in color.

4. The method of claim 1, further comprising:
   exposing the substrate with at least one exposure vector while in a plurality of different positions on the z-axis to form a plurality of exposure patterns;
   optically evaluating the optical contrast between at least some of the plurality of exposure patterns; and,
   determining the focal position of the laser beam base at least in part on the optical evaluation.

5. The method of claim 1, wherein at least one of the first exposure pattern and the second exposure pattern comprises an optically detectable geometric assignment feature assigned to a certain exposure position.

6. The method of claim 5, where the at least one of the first exposure pattern and the second exposure pattern comprises a tooth-shaped or pinnacle-shaped exposure pattern, and wherein the optically detectable geometric assignment feature comprises a tip of the tooth-shaped or pinnacle-shaped exposure pattern.

7. The method of claim 5, wherein the optically detectable geometric assignment feature comprises a line protecting beyond the rest of the exposure pattern.

8. The method of claim 1, wherein a distance between the first exposure position and the second exposure position is from 0.5 mm to 1 mm.

9. The method of claim 1, wherein a distance on the z-axis between the first exposure position and the second exposure position is at least 0.1 mm.

10. The method of claim 9, wherein a distance on the z-axis between the first exposure position and the second exposure position is from 0.5 mm to 1 mm.

11. The method of claim 1, wherein the exposure vector used in the first exposure position and the exposure vector used in the second exposure position are parallel.

12. The method of claim 1, wherein the exposure vector used in the first exposure position and the exposure vector used in the second exposure position are displaced by an offset of 0.1 mm to 1 mm.

13. The method of claim 12, wherein the offset is about 0.2 mm.

14. The of claim 1, further comprising adjusting the exposure device based determining the focal position of the laser beam.

15. The method of claim 1, wherein the substrate is arranged on a carrying element movably supported along the z-axis.

16. An apparatus for additive manufacturing three-dimensional objects, wherein the apparatus comprises an x-axis horizontally oriented, a y-axis horizontally oriented, and a z-axis vertically oriented, the apparatus comprising:
   an exposure device configured to generate a laser beam; and,
   a control device for generating one or more control commands, the control commands comprising:
     exposing a substrate with at least one exposure vector while in a first exposure position on the z-axis to form a first exposure pattern;
     exposing the substrate with at least one exposure vector while in a second exposure position on the z-axis to form a second exposure pattern;
     optically evaluating an optical contrast between the first exposure and the second exposure; and,
     determining a focal position of the laser beam based at least in part on the optical evaluation.

17. The apparatus of claim 16, further comprising a detection and determination device for optically evaluating the optical contrast.

18. The apparatus of claim 16, further comprising a carrying element for supporting the substrate, wherein the carrying element is moveable along the z-axis.

19. The apparatus of claim 16, wherein the control commands further comprise moving the carrying element along the z-axis.

20. The apparatus of claim 16, wherein the substrate is arranged on a carrying element movably supported along the z-axis.

* * * * *